United States Patent [19]

Rolstad et al.

[11] 3,766,007

[45] Oct. 16, 1973

[54] METHOD FOR THE CONTROL OF A BOILING WATER REACTOR AND A BOILING WATER REACTOR FOR PERFORMING SAID METHOD

[75] Inventors: Erik Rolstad, Halden; Einar Jamne, Kjeller, both of Norway

[73] Assignee: Institutt for Atomenergi, Kjeller, Norway

[22] Filed: Mar. 31, 1970

[21] Appl. No.: 29,338

[52] U.S. Cl. .................... 176/56, 176/63, 176/87
[51] Int. Cl. ........................................... G21c 15/26
[58] Field of Search ............... 176/54, 55, 56, 87, 176/20, 62, 63

[56] References Cited
UNITED STATES PATENTS

| 3,231,474 | 1/1966  | Jones et al. ............... 176/54    |
| 3,284,312 | 11/1966 | West ...................... 176/20 R X |
| 3,429,775 | 2/1969  | Petersen .................. 176/54     |
| 2,994,657 | 8/1961  | Petrick .................... 176/54    |
| 3,393,127 | 7/1968  | Detman et al. ........... 176/62 X     |
| 3,537,910 | 11/1970 | Zogran et al. ............ 176/20 R X  |
| 3,247,650 | 4/1966  | Kornbichler ............. 176/54 X     |
| 3,036,964 | 5/1962  | Horning .................. 176/54 X    |

OTHER PUBLICATIONS

Chirkin, V. S., "Systems of Heat Removal From Nuclear Reactors," J. Nuclear Energy II, 1957, Vol. 5, pp. 124 to 134.
MacPhee, John, How to Control a Boiling Reactor, Nucleonics, December, 1955, pp. 42–45.
International Conference on the Peaceful Uses of Atomic Energy, Carlbometal, 1958, Vol. 11, paper 172.

Primary Examiner—Carl D. Quarforth
Assistant Examiner—E. E. Lehmann
Attorney—Watson, Cole, Grindle & Watson

[57] ABSTRACT

The invention relates to the control of a boiling water reactor in which the water circulates by natural convection in the reactor tank through the core, a riser above the core and a downcomer. By varying the water level in the downcomer, the flow rate of circulation and thereby the void fraction in the core and the reactivity are changed. The water level in the downcomer may be adjusted by transferring water to or from an auxiliary reservoir. The local circulation flow rate may be influenced by having a graded riser and by the use of nozzles.

6 Claims, 7 Drawing Figures

Patented Oct. 16, 1973

INVENTOR
Erik Rolstad
BY
Einar Jamne
Watson, Cole, Grindle & Watson
ATTORNEY

METHOD FOR THE CONTROL OF A BOILING WATER REACTOR AND A BOILING WATER REACTOR FOR PERFORMING SAID METHOD

The invention relates to a method for the control of a boiling water reactor with natural convection circulation and a boiling water reactor suitable for performing said method. A reactor of this type usually comprises a reactor tank, a reactor core disposed in the reactor tank, a riser immediately above the reactor core, a downcomer, a steam chamber, a steam outlet and an amount of water, which circulates by means of natural convection in a circuit through the reactor core, the riser and the downcomer, partly evaporates in the reactor core and delivers steam to the steam chamber.

Lately it has been built a considerable number of power reactors of the boiling water type in several countries. Most of these reactors, however, have been designed for large power outputs, especially because the economical competitability of power reactors is strongly increasing with the reactor size. In large boiling water reactors natural convection circulation does not give satisfactory specific power yield of the reactor core. Therefore, such large boiling water reactors must be provided with circulation pumps or circulation arrangements as disclosed in applicant's Norwegian Patent Nos. 106,070 and 106,428.

In many instances, however, it may be desirable to utilize relatively small power-producing reactors, of the order of 100 MWe or less. Such reactors may find application in areas which are not connected to extentive joint power distribution systems, or for meeting a local demand of processing steam.

The present invention aims at such simplification of boiling water reactors having natural convection circulation, as to make them economically advantageous in small units.

In practically all nuclear reactors control rods are utilized for power regulation. The control rods with associated driving means are, however, expensive due to the comprehensive safety demands which are made on these elements. Almost all reactors use their control rods for start up and shut down, and further for emergency shut-off. Also, the contrl rods are often utilized during normal operation to control the reactor power according to temporary variations in steam consumption, to adjust the power distribution in the core and to compensate for the excess reactivity which the reactor must possess. The term "control" designates in the present patent application power regulation as well as regulations in response to temporary steam consumption variations, adjustments of the power distribution in the core and the compensation for said excess reactivity.

Frequent use of the control rods entails, however, increased wear of the same and thus increased costs. Further, a compensation for the excess reactivity in the control rods brings about an uneconomical utilization of the fuel.

To avoid the use of the control rods to a greatest possible extent, adsorbers containing burnable poison have previously been used. In this way the excess reactivity may be compensated, but still the utilization of the fuel will be uneconomical and the temporary variations in steam consumption must still be compensated by means of the control rods.

Also, it has been suggested to control the reactor power by changing the composition and/or the temperature of the moderator. In boiling water reactors the same water is used both for moderation and cooling, and usually the generated steam is transferred directly to a steam turbine. Therefore, it will not be suitable to the purpose to produce steam of varying composition or quality.

It is an object of the invention to avoid the use of control rods during the operation of boiling water reactors with natural convection circulation, without using burnable poison, and at the same time to allow direct utilization of the developed steam.

This is achieved by means of the method according to the invention by adjusting the water level in the downcomer in relation to the upper edge of the riser to control the flow rate in the core and therewith the void fraction in the same. Here the term "void fraction" designates the steam fraction by volume of the steam/water mixture in the reactor core. Variations in the flow rate bring about changes in the void fraction. Therewith the moderation effect changes and consequently also the output power of the reactor.

According to a feature of the invention the water level in the downcomer is determined by the pressure in the steam chamber. On the other hand the pressure in the steam chamber will be dependent on the steam output through the outlet. To keep the pressure of the steam chamber constant a valve may, according to the invention, be disposed in the steam outlet. This valve may in turn be controlled by a water level sensor in the reactor tank or by the steam pressure in order to keep the water level in the downcomer constant within shorter periodes of time. Consequently, the void fraction will not in this case be subjected to short-time variations, and the reactor power may be kept constant within shorter periodes, if this is desirable. However, the water level must be changed periodically in the course of the operation period to allow for the decreasing reactivity of the reactor core and the resulting change of the void fraction.

To allow a transfer of water to or from the tank for adjustment of the water level in the downcomer, the water in the tank may communicate with an auxiliary reservoir. Hereby, said reservoir should be kept under constant pressure, in order to allow the pressure in the steam chamber to determine the water level in the downcomer. Thus, in this case the water surface in the downcomer may be kept at the desired level by means of free communication between the reactor tank and the auxiliary reservoir.

According to another feature of the invention the pressure in the steam chamber is determined by the difference between the water levels in the auxiliary reservoir and the downcomer, respectively.

In order to bring about the required difference between the water levels in the auxiliary reservoir and the downcomer, respectively, the reactor tank may, according to the invention, be submerged in the auxiliary reservoir which is exposed to atmospheric pressure. An advantage of this method is that the pressure on the reactor tank walls will be far lower than the steam pressure inside the tank, so that the walls need only be dimensioned for a fraction of the strain occuring in a corresponding reactor tank having a conventional location. A reactor system where this method is employed in order to bring about a sufficient nominal pressure in the steam chamber is further described in Example 1.

Also, the communication with the auxiliary reservoir may be arranged through flow controlling organs, e.g. a pump-and-valve arrangement.

Boiling water reactors are usually designed to give negative void reactivity coefficient. When, for example, the steam chamber pressure increases, water will flow from the reactor tank to the auxiliary reservoir, which causes a fall of the water level in the downcomer. As the water column in the downcomer constitutes the driving force of the circulation flow, this will result in a lower flow rate, which brings about an increasing void fraction in the riser. As a result of this the reactor power and consequently the steam chamber pressure will decrease. If, however, the pressure in the steam chamber decreases to begin with, the opposite chain of cause and effect will bring about an increase of the reactor power and, with that, said steam pressure. Thus, as the reactor all the time is endeavouring to attain a steam production rate which balances the steam output rate from the steam outlet, it will be selfregulating.

In a reactor for performing the method according to the invention, the reactor tank contains a first amount of water sufficient to fill up the same to a level in the downcomer between the top of the reactor core and the upper edge of the riser. The reactor tank is connected with an auxiliary reservoir through flow defining connection means at a level below the reactor core, while the auxiliary reservoir contains a second amount of water in interchange relation with the first amount of water through the flow defining means.

According to the invention the riser may be divided in parallel flow sections by means of vertical partitions. Possibly, there may be arranged as many sections as there are fuel elements in the core. This may be achieved by enclosing each fuel element in a shroud, extentions of said shrouds constituting, in combination, the riser. Such division in sections allows local influence on the circulation, and, with that, on the power distribution. According to the invention, such influence may be effected in the most facile manner by grading the top of the riser in steps, so as to form a number of regions with different riser length. The purpose of such grading is to achieve a lower flow rate in the central sections when the reactor is operated with large excess reactivity. This brings about a greater void fraction than that occuring with a flat riser top and the same reactor power output. The resulting higher undermoderation of the central core regions early in the operation period will cause a more uniform radial flux distribution factor. At the same time an advantageous high burn-up is achieved in the peripheral regions of the core, whereas fuel is saved in the central regions while the excess activity is large. Thus, when reactivity problems occur towards the end of the period, the central regions will be in a more favourable condition. This is important, as the central regions give the greatest contribution to the total reactivity of the core. Thus, the graded riser will give a higher burn-up than a riser with flat top.

Special stabilization problems may possibly occur when the water level reaches the upper edge of one of the riser regions. In this case the water level may be brought rapidly to pass this level by inserting at least one control rod temporarily, and pulling the same out again when the water level has passed this critical level.

A similar local influence on the circulation, and with that on the fuel load, may be effected, according to the invention, by providing at least some of the flow sections with removable nozzles in their lowermost parts. For instance, the central and intermediate flow sections may be provided with nozzles during the early operation period, whereupon the nozzles are removed towards the end of the same period. The use of nozzles according to the invention will moreover have a stabilizing effect on the water flow in the flow sections or cooling channels.

According to the invention the reactor tank may be submerged in the auxiliary reservoir, the water in the reactor tank communicating with the auxiliary reservoir through at least one aperture in or near the tank bottom. If the auxiliary reservoir is in the form of a well, substantially deeper than the vertical extension of the reactor tank, a very safe, and at the same time simple reactor design may be accomplished.

When a pipe accidentally is broken or the reactor suddenly fails for some reason, a pressure loss will occur and water from the surrounding well will consequently invade the tank, so that the reactor core is kept under water, and the pressure loss is counteracted. Thus the water will not boil off as it usually will do as a reaction on a pressure loss in a conventional reactor system.

In this embodiment the resulting pressure on the tank walls will in practice be far lower than the steam pressure inside the tank, so that said walls need only to be dimensioned for a fraction of the strain occuring in a corresponding reactor tank in a conventional system.

It is sought, by means of suitable devices according to the invention, to keep the water exchange between the reactor tank and the surroundings as low as possible under normal working conditions.

With increased pressure in the tank an exhaust pipe, which is connected to the steam outlet and ends blindly in the well at a level above the reactor core, prevents, according to the invention, the water level in the tank from sinking so low that the core will be drained and thereby damaged.

On the background of these features it may be readily understood that the present reactor system in fact possesses inherent safety qualities, which make complex security systems and/or special safety zones around the reactor plant unnecessary.

The major advantages achieved by means of the method according to the invention are as follows:

When the excess reactivity is compensated by undermoderation of the core, a greater part of the neutrons will be absorbed by U-238 atoms, which thereby are converted to fissile plutonium. This will cause a higher burn-up.

The control rods are not burned up, and their driving means are exposed to less wear and may thus be made simpler.

The reactor may be made self-regulating (Examples 1 and 2) or easily controllable (Example 3).

The invention is primarily of interest in connection with reactors utilizing light water, but may also be of importance for heavy water reactors. Therefore, the term "water" generally designates both light and heavy water, and also mixtures of the same, in the present description and claims.

In connection with the operation of a given reactor, the method according to the invention, may be applied to a larger or smaller extent, the reactor being further regulated by means of control rods or other control organs. Thus in certain reactors the control rods may be utilized for a damping of fast power variations or for a partial compensation of the excess reactivity in the beginning of the operation period. This will result in smaller variations in the void fraction of the reactor core than those occuring when the method according to the invention is applied exclusively.

For a further illustration of the invention, three examples of embodiments of the same will now be described with reference to the accompanying drawings.

Figure 1:
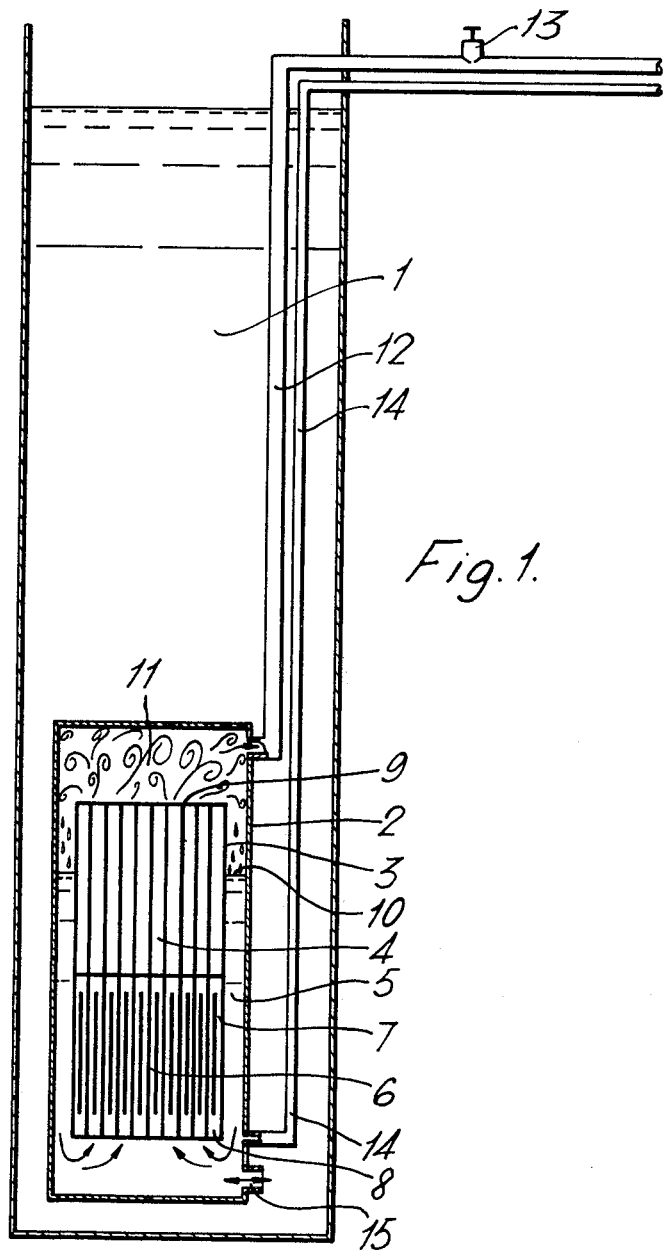
FIG. 1 is a schematical sectional view of a nuclear reactor mounted in a deep well, and suitable for carrying out the method according to the invention.
Figure 4:
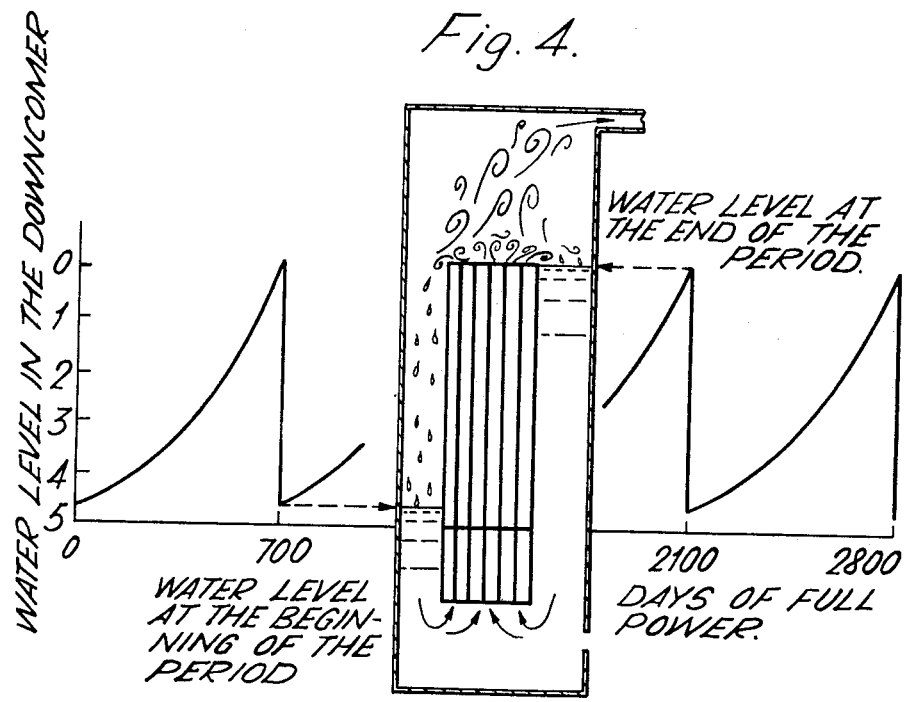

FIG. 4 displays the time variations of the water level in the downcomer of the reactor in FIG. 1.

Figure 5:
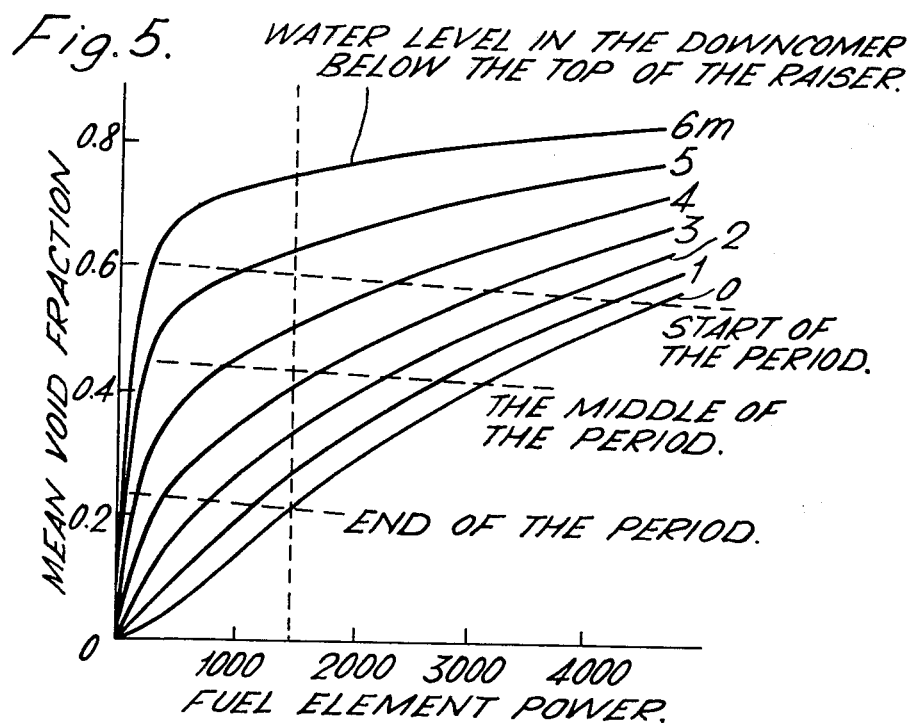

FIG. 5 displays the mean void fraction of the reactor in FIG. 1 as a function of fuel element power and water level in the downcomer.

Figure 6:
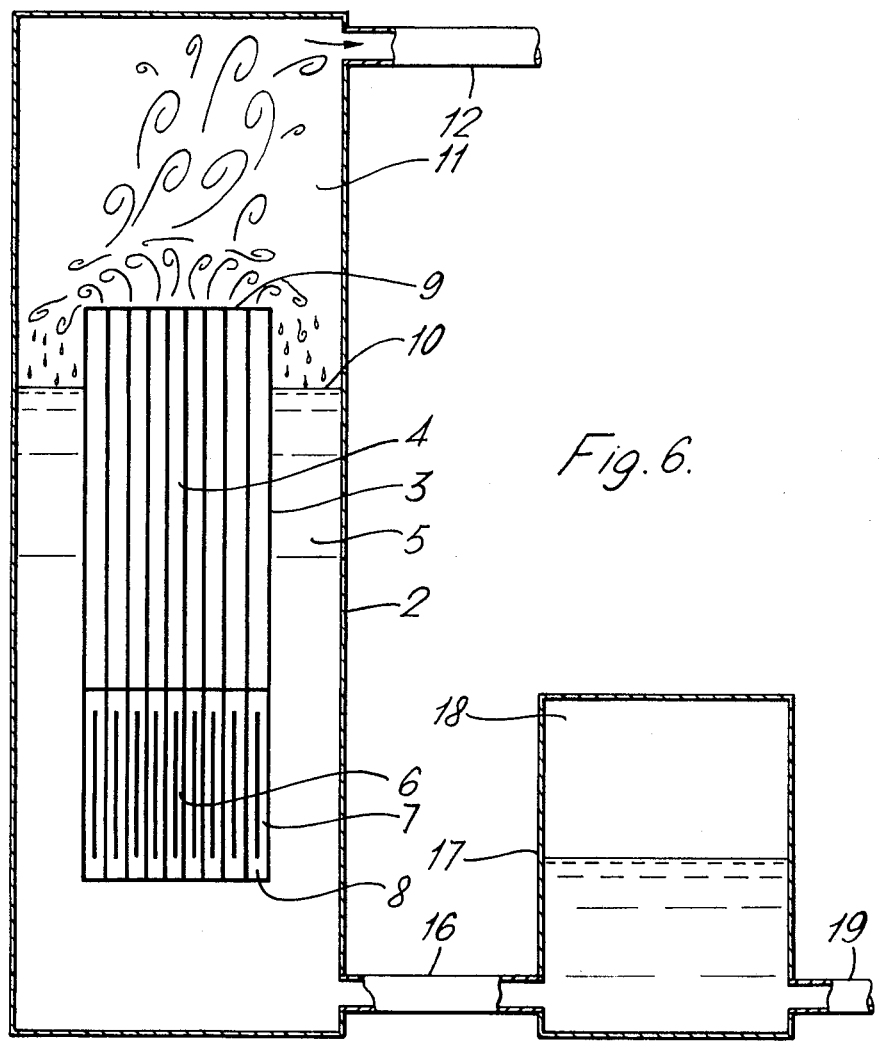

FIG. 6 is a schematical sectional view of another nuclear reactor suitable for performing the method according to the invention, and wherein the reactor tank communicates with a reservoir tank.

Figure 7:
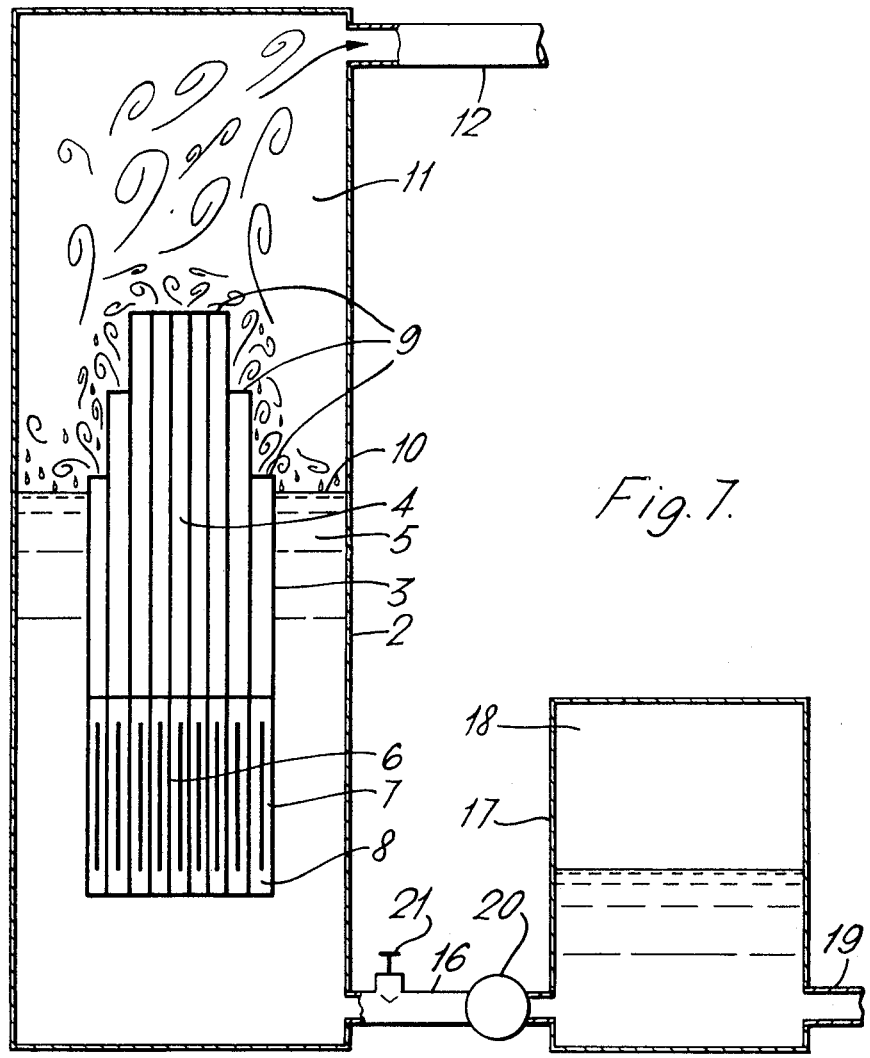

FIG. 7 is a schematical sectional view of another version of the nuclear reactor in FIG. 6.

EXAMPLE 1

Referring to FIG. 1, 1 designates a deep well. In the well 1 a reactor tank 2 is submerged to a depth substantially greater than the height of said tank. By means of a vertical partition 3 the reactor tank 2 is divided into a riser 4 and a downcomer 5. Below the riser 4 there is disposed a reactor core consisting of a number of fuel elements. The design of the reactor core 6 is not shown in the Figure, but it may suitably be composed of a cluster of fuel elements mounted in shrouds, which form vertical cooling channels. The fuel elements are indicated at 7 and said cooling channels at 8 in the Figure. The riser 4 is filled to the edge 9 with water serving both as a moderator and a cooling agent. Also, the downcomer 5 contains water, the water level 10 in said downcomer being lower than that in the riser. Because of the nuclear heat in the reactor core, a part of the cooling water is converted to steam in the core. The steam/water mixture flows upwards through the vertical cooling channels 8 by means of natural convection, the steam/water column in the reactor core and the riser being lighter than the water column in the downcomer. The steam is gathered in a steam chamber 11 and from there let out through a steam outlet 12, whereas the water from the top of the riser runs down into the downcomer to continue the circulation. An automatic operated control valve 13 is disposed at the steam outlet 12. The steam is utilized in a steam turbine or other steam consuming devices, which are not shown in the Figure. The condensate is returned to the reactor tank through the pipeline 14. Through apertures 15, near the bottom of the reactor tank, the water in the tank communicates with the water in the well. The object of the apertures 15 is to allow the water to flow from the reactor tank 2 to the well 1 in order to lower the water level 10 in the downcomer 5, when the reactor produces more steam than what is taken out from the outlet 12. When the reactor produces less steam than said amount taken out through the outlet, water is sucked into the reactor tank 2 and the water level in the downcomer rises. An exhaust pipe (not shown) is connected to the steam outlet and ends blindly in the well at a level above the reactor core. This pipe will automatically prevent the water level in the reactor tank from sinking below the top of the core.

The system includes a combined circulation circuit for cleaning up the water in the reactor tank 2 and well 1 from radioactive contamination, and cooling of the water in the well, because this water is heated as a result of the thermal losses in the tank. It is aimed at a maintenance of the water in the well at a temperature below 40°–60°C, but because of the large mass of water involved in the system, a system according to the invention may operate with an inactive cooling circuit during long periods, e.g. during maintenance work, without appreciable disadvantages. (This circuit is not shown in the FIGURE).

The water column in the downcomer provides the driving pressure of the flow through the core 6 and the riser 4, so that, when the water level 10 in the downcomer rises, the flow rate through the core 6 will increase. Because of this the fractional steam volume in the core is reduced, and the reactor power increases due to the negative void reactivity coefficient.

Thermohydraulic and reactor physical calculations in relation to a boiling water reactor, wherein the power is regulated by means of the method according to the invention, have been performed under the following presumptions:

A nuclear reactor, essentially corresponding to the one described above, is disposed at the bottom of a 150 m deep well, containing light water. The reactor has a core, which contains 7500 kg $UO_2$, 2.8 percent enriched in U-235, in the form of fuel rods with a diameter of 14 mm and which are canned in Zircaloy 2 (containing 1.20 – 1.70% Sn, 0.007 – 0.20% Fe, 0.05 – 0.15% Cr, 0.03 – 0.08% Ni, in all: 0.18 – 0.38% Fe + Cr + Ni, 0.09 – 0.16% O and the rest Zr).

The core, which has a height of 1.4 m and a nominal diameter of 1.8 m is divided into 52 channels with square cross sections. Each of these channels contains a fuel element with 64 fuel rods. The uranium to water ratio in the core is equal to 3, whereas the height of the riser is 5 m and the cross sectional area of the downcomer is 7.5 m². During the full operational cycle 13 of said 52 fuel elements are exchanged with new ones at each fuel change.

With the assumtions mentioned above, the calculations demonstrated that, by a nominal thermal power of 75 MW, i.e. a mean fuel element power of 1450 kW, the core should be in possession of an excess reactivity of 8 percent $\Delta k$ at the start after the first fuel charge. To compensate this excess reactivity the core should be run with a mean void fraction of 59 percent, which corresponds to a void reactivity coefficient of $-0.4$ percent $\Delta k/\%$ void. Under these conditions the water level was expected to find its natural position about 4.5 m below the top of the riser. The mean burn-up was calculated to be about 28MWd/kg $UO_2$, and the operation period between two fuel changes was found to be about 700 days with full output power.

According to the calculations the excess reactivity decreased roughly linear with the burn-up. In the beginning of a period between two fuel changes the water level was found to be rising slowly and then faster towards the end of the period. At the time the water level was reaching the top of the riser, the core was calculated to be run with a mean void fraction of 23 percent, and the void reactivity coefficient was estimated to be − 0.15 percent Δk/% void. Under these circumstances the reactor should be stopped for change of fuel.

Figure 2:
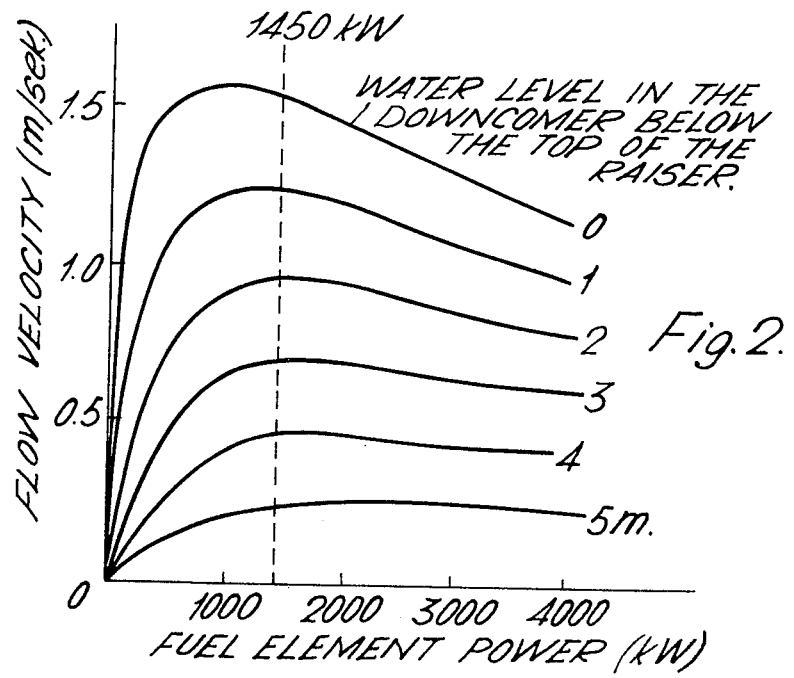
FIG. 2 illustrates the flow rate through the reactor core in FIG. 1 as a function of fuel element power and water level in the downcomer.
Figure 3:
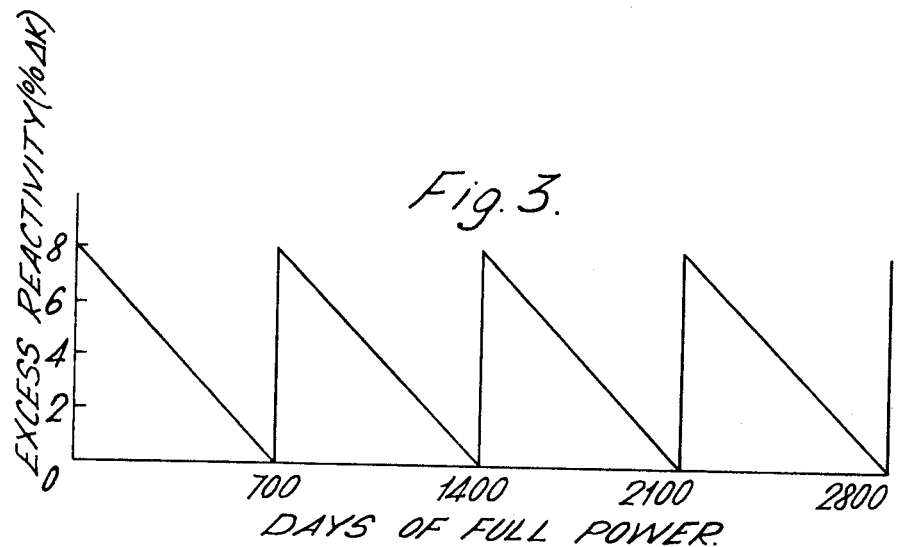
FIG. 3 illustrates the time variations of the excess reactivity of the reactor in FIG. 1.

It will be evident from FIG. 2, that it is almost linear interdependency between the flow rate and the water level in the downcomer within the pertinent range. FIGS. 3 and 4 display how the excess reactivity and said water level are expected to vary during said operation period. Here it is presumed that the fuel core has reached equilibrium of burn-up.

FIG. 5 shows the mean void fraction in a channel as a function of fuel element power and water level in the downcomer. The dash lines indicate the possible power ranges, respectively at the beginning, in the middle, and at the end of an operation period. It will be seen that at the end of said period, there exists no possibility of increasing the power above the nominal level, i.e. 1450 kW. Also, from FIG. 5 it is possible to estimate the sensitivity of the power output level to changes in the water level. Preliminary investigations, however, seem to indicate that the system will be dynamically stable in practice. If stability problems should arise during parts of the operation period, the water level may be controlled by means of the valve 15 in the water outlet 3. The start of the reactor must take place by means of control rods and with the water level above the top of the riser. When the power has reached e.g. 30 percent of the full power level, the water level is allowed to fall below the top of the riser, whereby the void reactivity regulation process automatically takes over the power control. Now, the control rods may be pulled out one by one, and, as a result of this, the water level will fall slightly for each rod which is withdrawn.

EXAMPLE 2

In the FIG. 6, as in FIG. 1, the reactor tank is designated by 2, the vertical partition by 3, the riser by 4, the downcomer by 5, the reactor core by 6, the fuel elements by 7, the cooling channels by 8, the upper edge of the riser by 9, the water level in the downcomer by 10, the steam chamber by 11 and the steam outlet by 12

Close to its bottom the reactor tank is connected, by means of a pipeline 16, to a reservoir tank 17, which is partly filled with water. Above the water level in said reservoir tank 17 there is a volume of gas 18. Condensate is not returned directly to the reactor tank as in Example 1, but to the reservoir tank through the conduit 19. The size of the gas volume 18 must be selected to secure a reasonably constant gas pressure during normal operation in spite of the said water exchange between the reservoir and the reactor tank in order to automatically regulate the water level in the downcomer and thereby the power output. To keep the reactor pressure approximately constant during the whole operation period, a system may be provided, which automatically transfers gas or water to or from the reservoir tank 17. Such systems are well known and consequently not shown in the Figure. In all other respects the reactor shown in FIG. 6, behaves like the reactor described in FIG. 1.

EXAMPLE 3

In FIG. 7 corresponding parts have the same reference numbers as in FIG. 6, but the connecting pipe-line 16 is in this case further provided with a pump 20 and a valve 21. The reactor power is regulated by means of active control of the water level in the downcomer 5. This control takes place by means of a pump-and-valve arrangement 20, 21. The pressure in the reactor tank is maintained constant by means of a valve (not shown) in the steam outlet 12. Further, in this Example the riser is divided radially in three regions, the central region having a greater length than the intermediate one, which in turn is longer than the peripherial region. The upper edge of the riser thus occupies three different levels, as shown in the Figure. To avoid a water transfer from the top of the central region to the outer cooling channels, thereby creating a great and varying counter-pressure in said channels, special arrangements, as baffles or the like, may be provided. Such arrangements are, however, not shown in the Figure.

We claim:
1. A boiling water nuclear reactor with self-regulated reactivity and steam production, and comprising:
   a. a reactor tank;
   b. a reactor core enclosed in said tank;
   c. a riser on the top of said core;
   d. an inner amount of water between the core and the riser on one hand and the tank on the other hand, the surface level of the water being set below the upper edge of the riser;
   e. an outer amount of water communicating with said inner amount of water;
   f. a steam chamber provided with a steam outlet and disposed above and in direct contact with the riser and said surface level of the inner amount of water;
   g. an internally flowing column of water and steam mixture; extending through the core and the riser, the steam content of said column being prodcuced by the core reactivity and supplied to said steam chamber;
   h. a water circulation comprising said inner amount of water and said flowing column of water and steam mixture, the driving force of said circulation being constituted by the difference of pressures exerted by said inner water amount and said column, respectively, at the level of the bottom of the reactor core, whereby self-regulation is achieved by the following closed chain of cause and effect:

Change of steam chamber pressure → change of inner amount of water → change of pressure difference at bottom of the core → change of water circulating flow → change of the steam content of the column of water and steam mixture → change of the core reactivity → change of steam supply to the chamber → steam chamber pressure change opposing said given change of steam pressure.

2. A reactor as claimed in claim 1, wherein the riser, by way of vertical partitions, is subdivided into a number of parallel flow sections with different heights increasing in steps inwardly from the outer edges of the riser, to define a corresponding predetermined grading in steps of the top surface of the same.

3. A reactor as claimed in claim 2, wherein at least some of said parallel flow sections are provided with removable water distribution nozzles in their lowermost parts.

4. A reactor as claimed in claim 1, wherein the reactor tank is stationary mounted in said auxiliary reservoir below the surface of the outer amount of water.

5. A reactor as claimed in claim 4, wherein said reactor tank is mounted significantly deeper below said surface than the vertical extension of the tank.

6. A reactor as claimed in claim 1, wherein said steam outlet is provided with at least one branch conduit ending blindly in the auxiliary reservoir at a level above the reactor core.

* * * * *

UNITED STATES PATENT OFFICE
CERTIFICATE OF CORRECTION

Patent No. 3,766,007  Dated  October 16, 1973

Inventor(s) Erik Rolstad and Einar Jamne

It is certified that error appears in the above-identified patent and that said Letters Patent are hereby corrected as shown below:

FOREIGN APPLICATION PRIORITY DATA

[30]  April 1, 1969   Norway   1370/69
      April 1, 1969   Norway   1373/69

Signed and sealed this 16th day of April 1974.

(SEAL)
Attest:

EDWARD M. FLETCHER, JR.  C. MARSHALL DANN
Attesting Officer  Commissioner of Patents